US008869751B2

(12) United States Patent
Ben Yosef et al.

(10) Patent No.: US 8,869,751 B2
(45) Date of Patent: Oct. 28, 2014

(54) ANIMAL HARNESS (71) Applicants: Yariv Ben Yosef, Givatayim (IL); Nimrod Lipkies, Michmoret (IL)

(72) Inventors: Yariv Ben Yosef, Givatayim (IL); Nimrod Lipkies, Michmoret (IL)

(73) Assignee: EZDog Ltd., Michmoret (IL)

( * ) Notice: Subject to any disclaimer, the term of this patent is extended or adjusted under 35 U.S.C. 154(b) by 0 days.

(21) Appl. No.: 13/855,759

(22) Filed: Apr. 3, 2013

(65) Prior Publication Data
US 2013/0263795 A1 Oct. 10, 2013

Related U.S. Application Data (60) Provisional application No. 61/620,016, filed on Apr. 4, 2012, provisional application No. 61/670,618, filed on Jul. 12, 2012.

(51) Int. Cl.
*A01K 27/00* (2006.01)

(52) U.S. Cl.
CPC .................... *A01K 27/002* (2013.01)
USPC ....................................... 119/856

(58) Field of Classification Search
CPC .................................... A01K 27/002
USPC ......... 119/770, 792, 816, 818, 850, 854, 856, 119/857, 868, 869; 54/71, 9.1, 79.4; D30/151, 152; 182/3, 6, 7
See application file for complete search history.

(56) References Cited

U.S. PATENT DOCUMENTS

| 3,795 | A | * | 10/1844 | Whiton | 2/44 |
|---|---|---|---|---|---|
| 311,267 | A | | 1/1885 | Springstun | |
| 2,826,172 | A | | 3/1958 | Buckle et al. | |
| 3,817,217 | A | * | 6/1974 | Matuka et al. | 119/868 |
| 5,145,027 | A | * | 9/1992 | Petzl et al. | 182/3 |
| 6,189,651 | B1 | * | 2/2001 | Sadeck | 182/6 |
| 6,244,379 | B1 | * | 6/2001 | Larson | 182/6 |
| 6,363,697 | B1 | * | 4/2002 | Shapiro | 54/23 |
| 6,431,313 | B1 | * | 8/2002 | Petzl et al. | 182/6 |
| 6,543,390 | B2 | * | 4/2003 | Lowery | 119/771 |
| 6,708,650 | B1 | | 3/2004 | Yates | |
| 6,837,187 | B2 | * | 1/2005 | Berardo | 119/792 |
| 7,044,087 | B1 | | 5/2006 | Brecheen | |
| 7,246,477 | B2 | * | 7/2007 | Hurwitz | 54/24 |
| 7,341,025 | B1 | * | 3/2008 | Streeter et al. | 119/857 |
| 8,171,892 | B1 | * | 5/2012 | Horgan | 119/792 |
| 8,336,506 | B2 | * | 12/2012 | Zimmerman | 119/856 |
| 2008/0177210 | A1 | * | 7/2008 | McDevitt Larson | 602/23 |
| 2011/0283956 | A1 | | 11/2011 | Silva | |
| 2011/0297105 | A1 | * | 12/2011 | Horiuchi | 119/792 |
| 2012/0000432 | A1 | | 1/2012 | Guiant | |
| 2012/0186537 | A1 | * | 7/2012 | Curtis | 119/725 |

OTHER PUBLICATIONS

International Search Report for application PCT/IB2013/052660 dated Sep. 24, 2013.

* cited by examiner

*Primary Examiner* — Rob Swiatek
*Assistant Examiner* — Ebony Evans
(74) *Attorney, Agent, or Firm* — Eitan, Mehulal & Sadot (57) ABSTRACT

A harness for restraining an animal, particularly a dog, includes: a body loop to encircle a rear abdominal area of the animal, wherein the body loop comprises a connector to a leash to be held by a person; and at least one rear-leg loop to encircle a top area of a rear leg of the animal; wherein the body loop comprises a lasso mechanism to create a lasso effect upon an outburst of said animal.

17 Claims, 14 Drawing Sheets

ANIMAL HARNESS

CROSS-REFERENCE TO RELATED APPLICATIONS

The present application claims priority and benefit from U.S. provisional patent application No. 61/620,016, entitled "Rear Strap System with Rear End Dog Harness", filed Apr. 4, 2012, and from U.S. provisional patent application No. 61/670,618, entitled "Rear Strap System with Rear End Dog Harness", filed Jul. 12, 2012, both of which are hereby incorporated by reference in their entirety.

FIELD OF THE INVENTION

The present invention relates to the field of leashes and harnesses for animals.

BACKGROUND

Many people own a pet or a companion animal. A pet, such as a dog or a cat, may live in the household of its human owner. The pet owner may take care of his pet, which in turn may provide companionship and enjoyment to its owner.

Many countries or cities require pet owners to restrain their pets in public places. Particularly, legislation may require a dog owner to hold the dog by a leash in public areas. The leash may allow the dog owner to restrain the dog, to prevent the dog from biting or frightening people or from causing damage to property, protecting the dog from vehicular traffic, to prevent the dog from getting lost or getting far away from its owner. Furthermore, a leash may be used as a method of communication between a dog owner and his dog, and may ensure control over the dog during training sessions.

SUMMARY

The present invention may include, for example, a leash or harness for a dog or other pet or animal, and particularly, a rear strap system or a rear-end dog harness. The harness may comprise a body loop for encircling the rear side or rear end of the abdominal area of the dog. The harness may further comprise two rear-leg loops, which may be slanted relative to the body loop or may be perpendicular thereto, for gripping the two rear legs of the dog. The body loop may be constructed to provide a lasso effect, such that an outburst of the dog may cause shrinkage of the body loop. Such shrinkage may cause sensation to the dog, particularly at the lower rear region of the abdominal area of the dog, thereby causing the dog to be submissive and compliant, without causing physical pain to the dog.

In accordance with the present invention, for example, a harness for restraining an animal may comprise: a body loop to encircle a rear abdominal area of the animal, wherein the body loop comprises a connector to a leash to be held by a person; at least one rear-leg loop to encircle a top area of a rear leg of the animal; wherein the body loop comprises a lasso mechanism to create a lasso effect upon an outburst of said animal.

In accordance with the present invention, for example, the lasso mechanism causes shrinkage of the body loop upon said outburst of said animal.

In accordance with the present invention, for example, upon said outburst of said animal, a lower region of said body loop generates sensation to underside of the rear abdominal area of the animal.

In accordance with the present invention, for example, prior to said outburst of said animal, a lower region of said body loop is maintained away from genitalia of the animal In accordance with the present invention, for example, the harness may comprise: a curved protrusion element to maintain a lower region of said body loop away from genitalia of the animal.

In accordance with the present invention, for example, at least an inward-facing side of the body loop is coated.

In accordance with the present invention, for example, a connection between the body loop and the at least one rear-leg loop is coated.

In accordance with the present invention, for example, a lower area of the body loop comprises a protrusion protruding away from an underside of the rear abdominal area of the animal.

In accordance with the present invention, for example, the protrusion comprises a curved protrusion.

In accordance with the present invention, for example, the protrusion comprises an upside-down U-shaped element.

In accordance with the present invention, for example, the at least one rear-leg loop comprise: a first rear-leg loop connected to said body loop at a first connection point; and a second rear-leg loop connected to said body loop at a second connection point; wherein the protrusion is located between the first and second connection points.

In accordance with the present invention, for example, the at least one rear-leg loop comprises: a first rear-leg loop for a rear-right leg of the animal, and a second rear-leg loop for a rear-left leg of the animal.

In accordance with the present invention, for example, the at least one rear-leg loop is connected at an angle to said body loop.

In accordance with the present invention, for example, said angle comprises an angle selected from the group consisting of: approximately 45 degrees, approximately 60 degrees, approximately 75 degrees, approximately 90 degrees, and approximately 105 degrees.

In accordance with the present invention, for example, the body loop comprises an open/close mechanism for opening/closing said body loop.

In accordance with the present invention, for example, the body loop comprises a diameter modification mechanism to allow the person to increase and decrease a diameter of said body loop independently of said outburst of the animal.

In accordance with the present invention, for example, wherein the connector comprises a D-shaped ring.

In accordance with the present invention, for example, the animal comprises a dog.

The present invention may provide other and/or additional benefits or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION OF THE PRESENT INVENTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Reference is made to FIGS. 1A-1E, which are schematic illustrations of multiple views of a harness 100 in accordance with the present invention. Reference is also made to FIGS. 2A-2C and FIGS. 3A-3C, which are schematic illustrations of multiple views of harness 100 in accordance with other implementations of the present invention. Harness 100 may be placed by a person ("owner" or "driver") around a rear area of an animal or a pet, for example, a dog 199 which is depicted for demonstrative purposes in FIG. 4.

Harness 100 may comprise, for example, a body loop 110 and two rear-leg loops 111-112. Body loop 110 may be placed around a rear portion of the body of dog 199. Right-side rear-leg loop 111 may be placed around a top area of a rear-right leg (hind) of dog 199. Left-side rear-leg loop 112 may be placed around a top area of a rear-left leg (hind) of dog 199.

Body loop 110 may be a lengthening loop, such that the owner may conveniently increase or decrease the diameter of body loop 110. For example, one or more thin or narrow buckles (e.g., two buckles 144-145) may be used to modify the diameter or the length of body loop 110, generally similar to one or more buckles which may be used to modify a length of a strap of a handbag or a strap of a backpack. Optionally, body loop 110 may be a monolithic loop formed of a single strap or band, or may be a multi-part loop having modular internal links or loop-portions which may be detachable or attachable. Body loop may 110 may be a single-circle loop which surrounds one time the rear abdominal area of dog 199, or may be a double-circle loop which may (partially or entirely) surround the rear abdominal area of dog 199. In some portions of body loop 110, optionally, two layers of strap or fabric or bands may exit, for example, due to a mechanism allowing the owner to increase and decrease the scope or diameter of body loop 110.

Figure 1A:
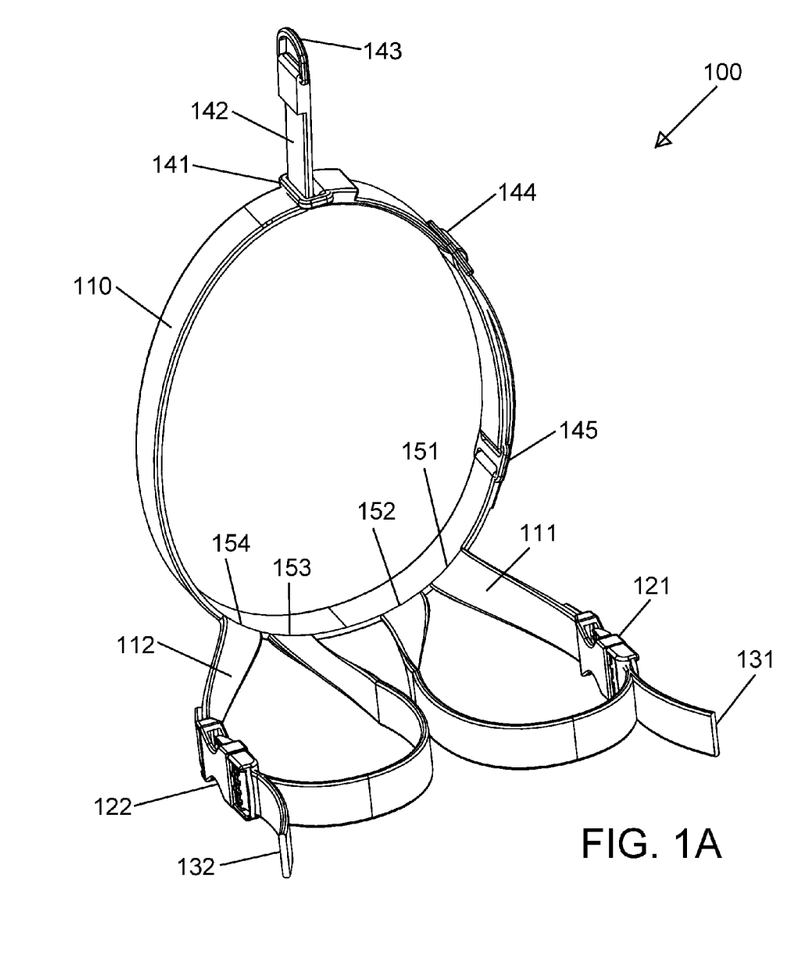
FIGS. 1A-1E are schematic illustrations of multiple views of a harness, in accordance with some demonstrative embodiments of the present invention.
Figure 1B:
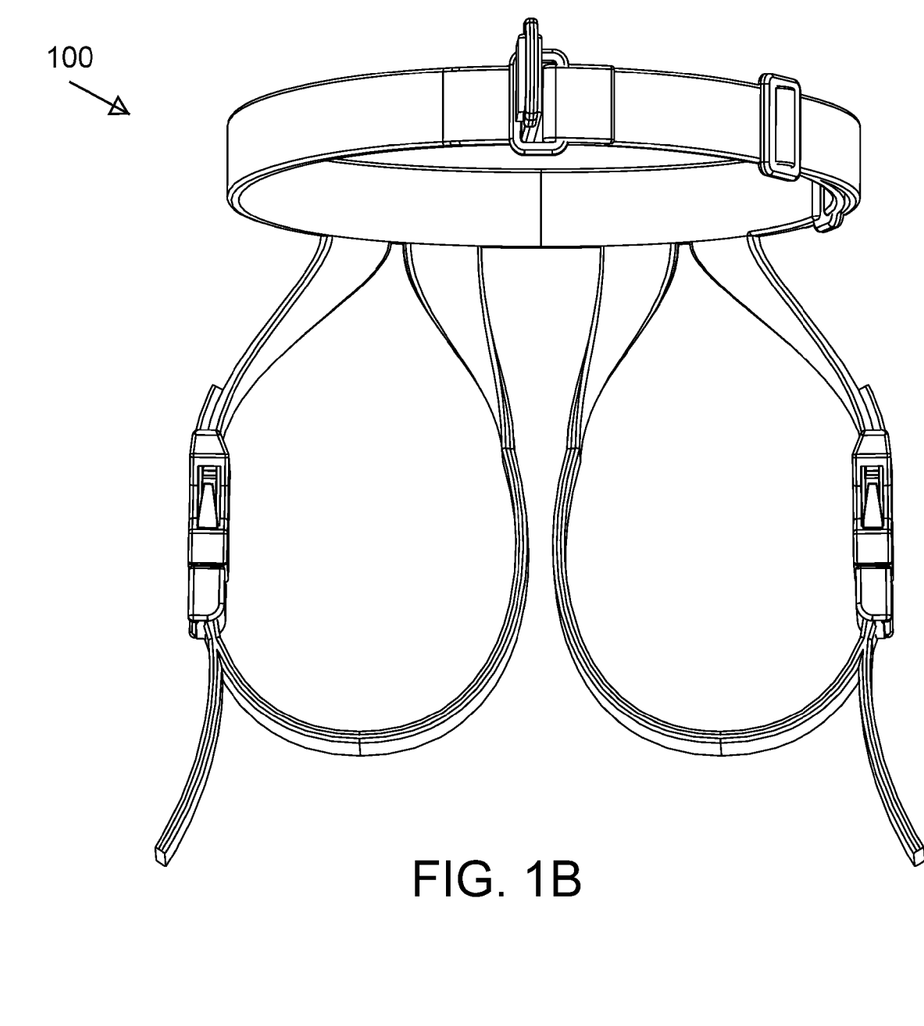
Figure 1C:
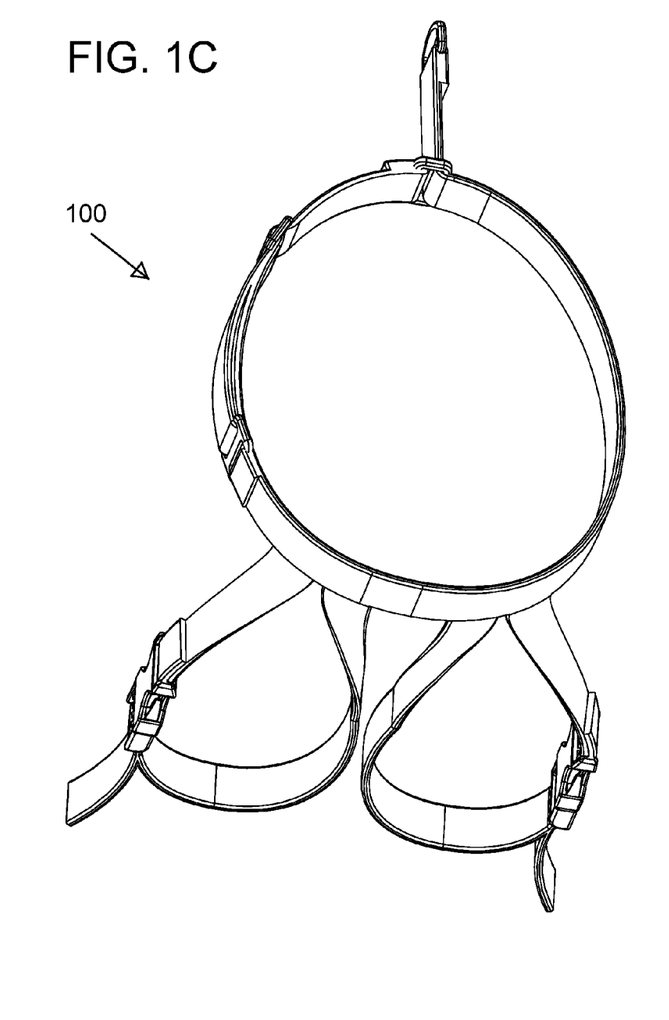
Figure 1D:
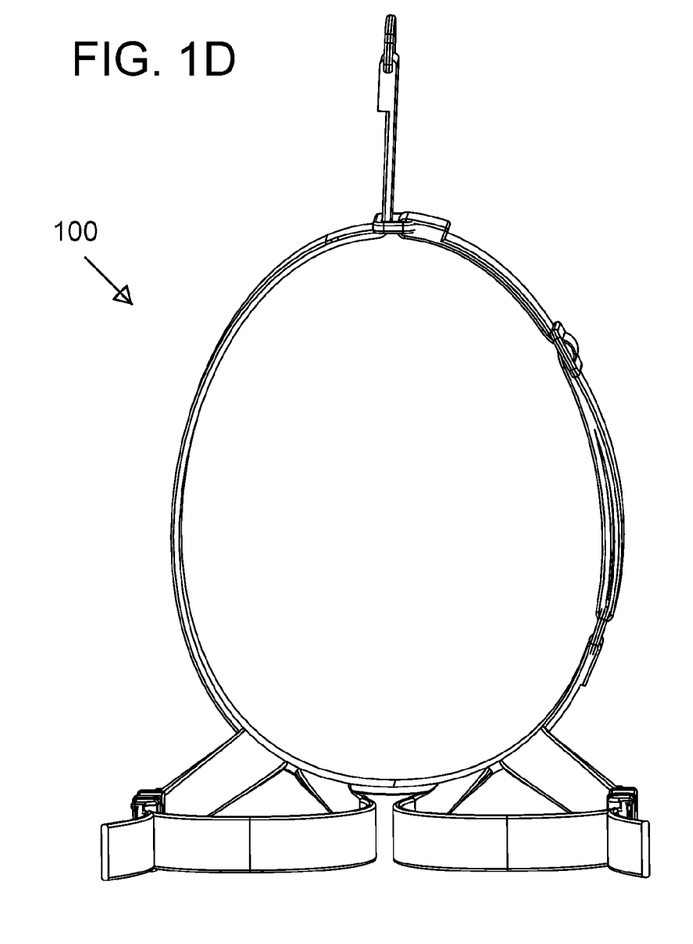
Figure 1E:
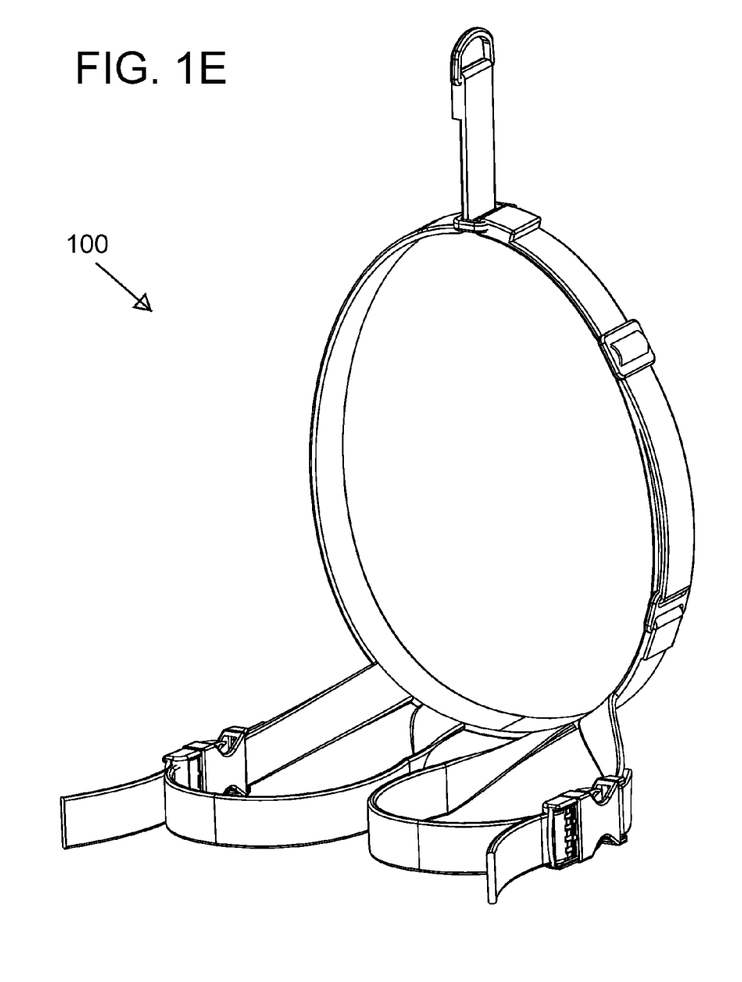
Figure 2A:
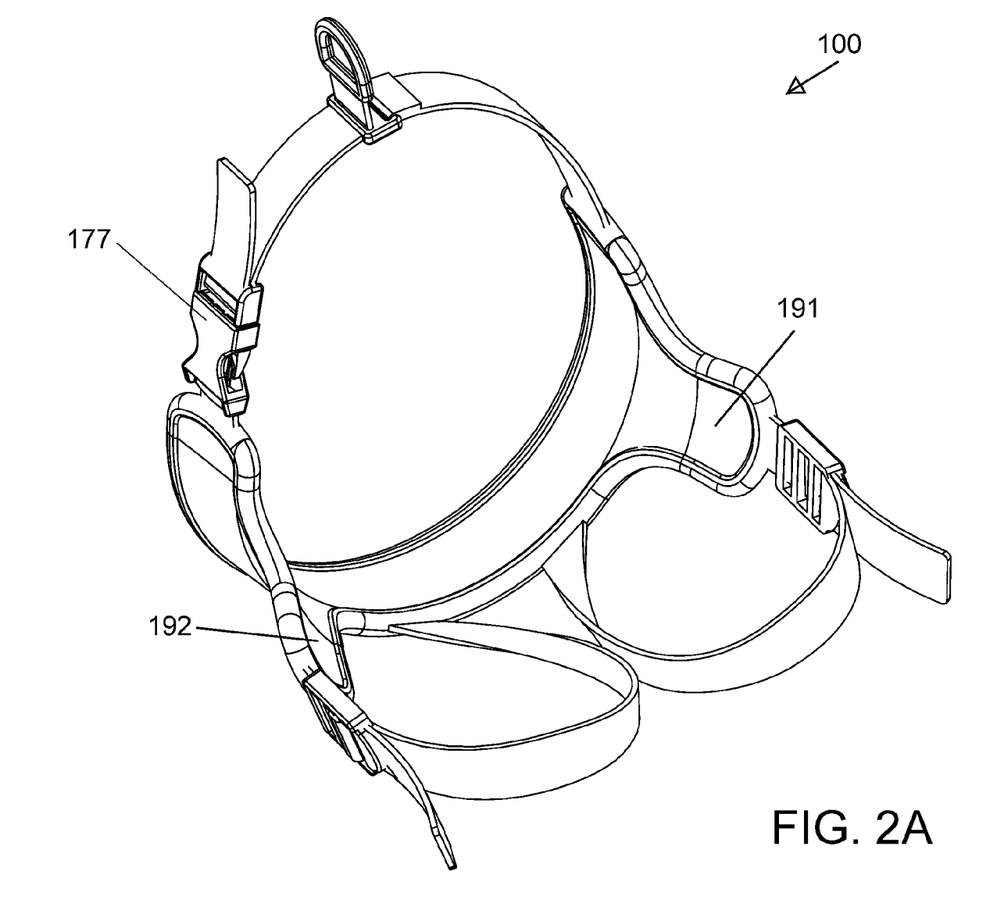
FIGS. 2A-2C and FIGS. 3A-3C are schematic illustrations of multiple views of a harness 100 in accordance with other demonstrative implementations of the present invention.
Figure 2B:
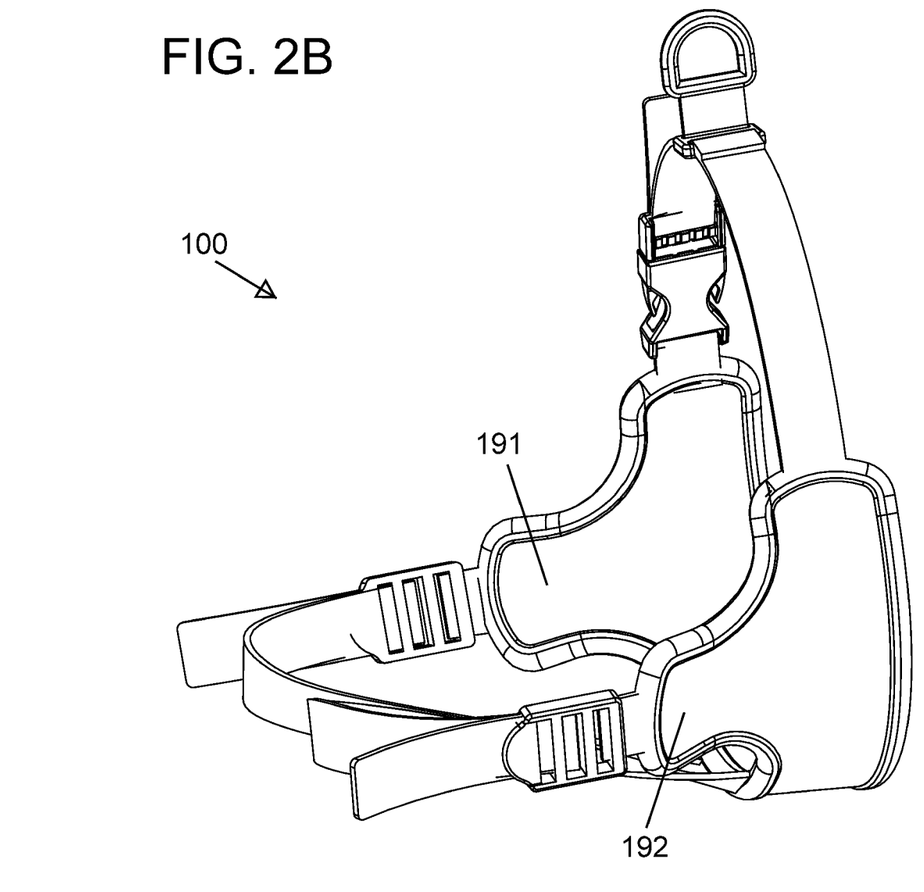
Figure 2C:
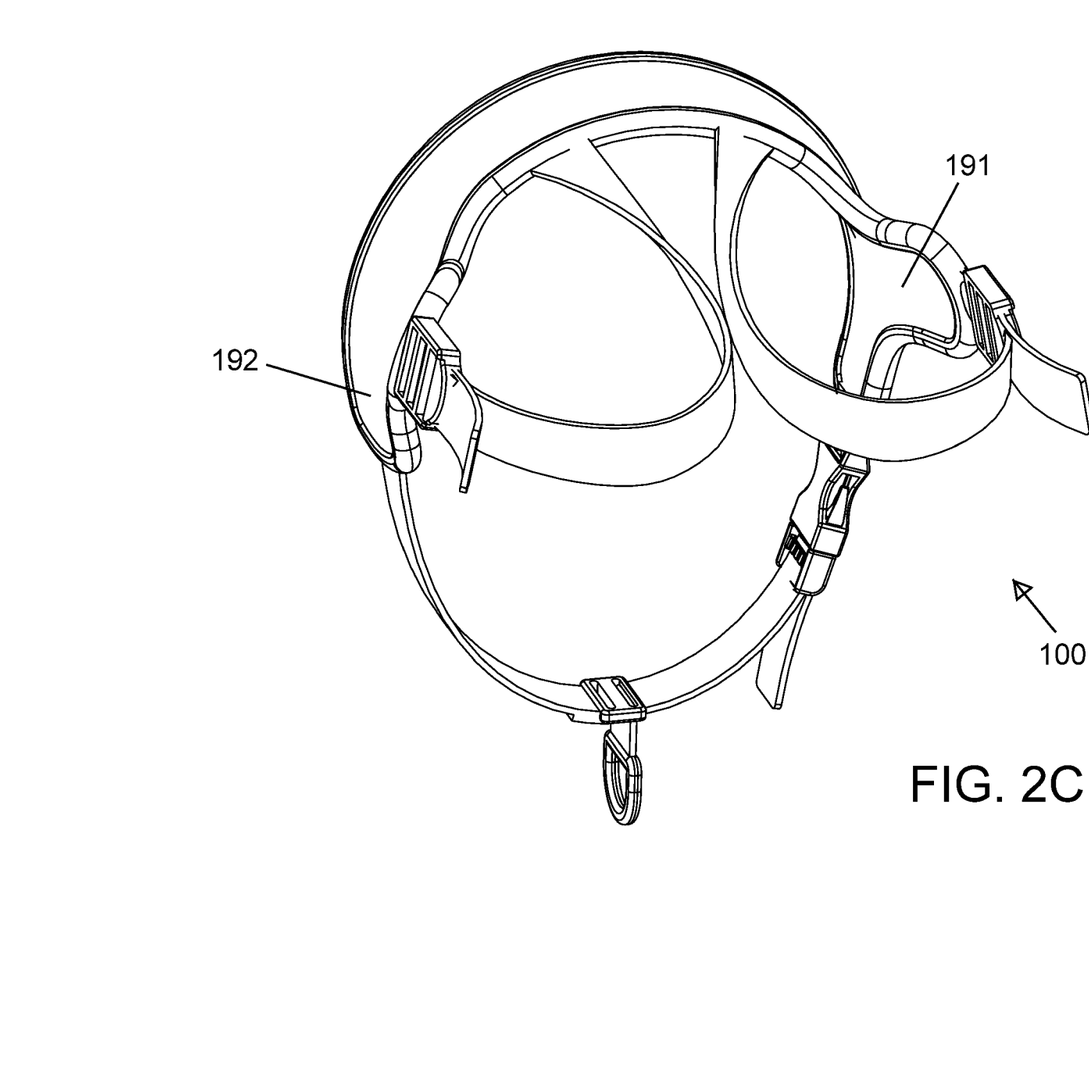
Figure 3A:
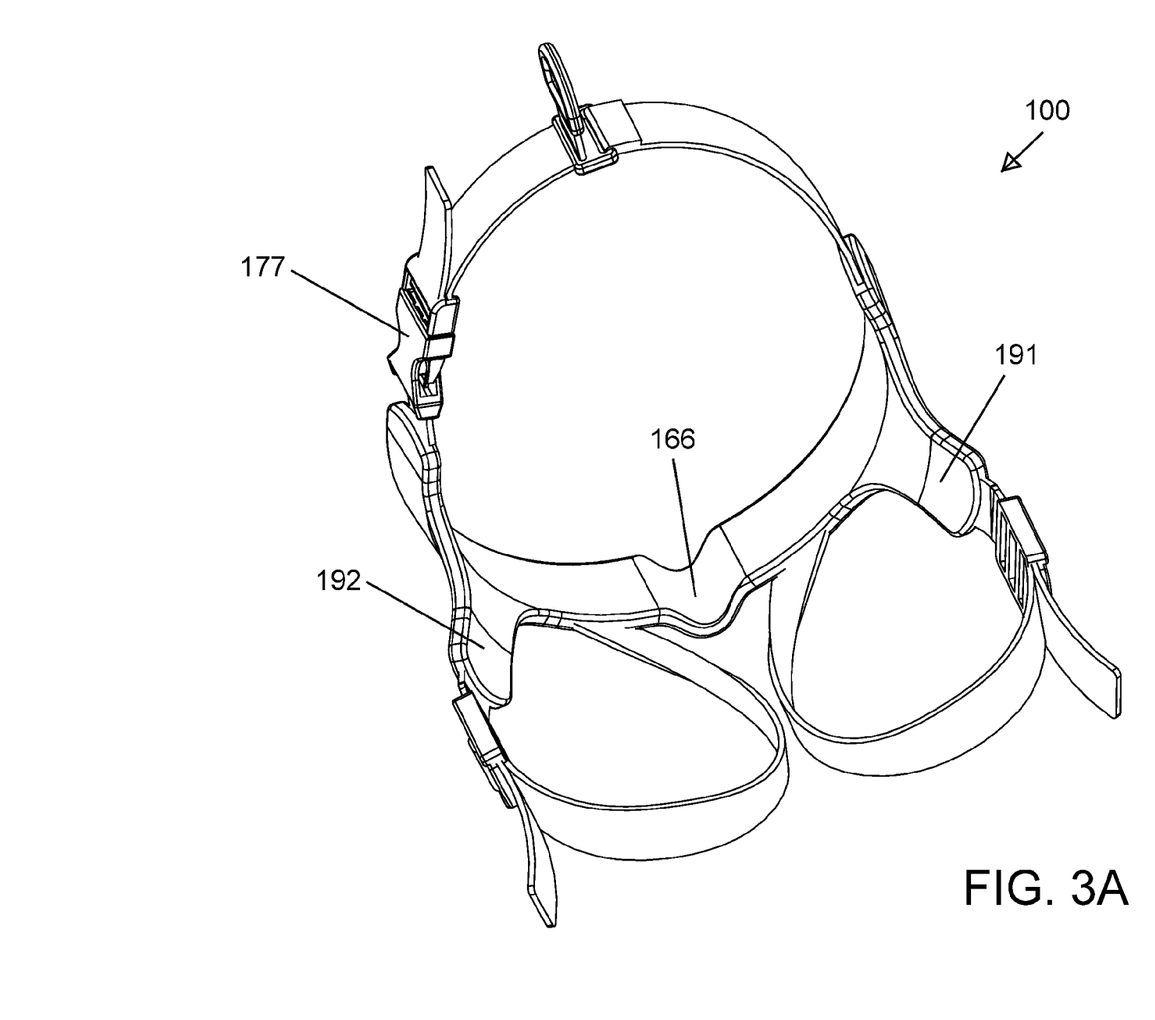
Figure 3B:
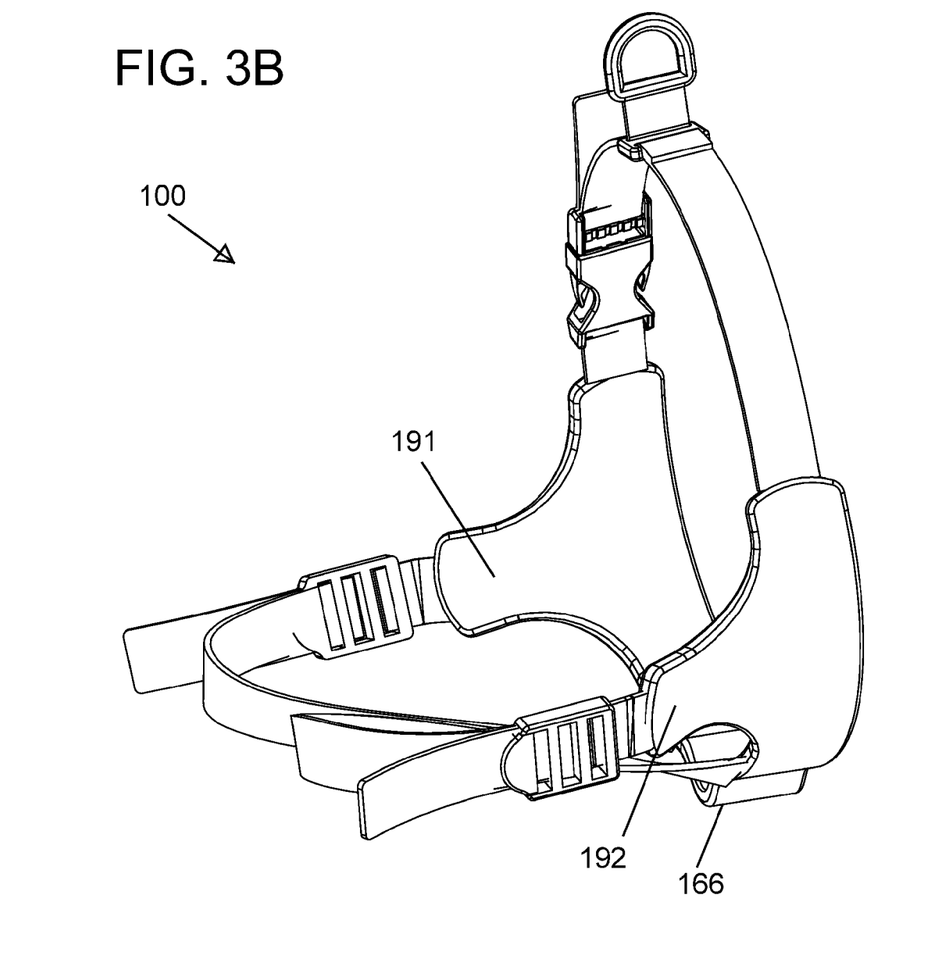
Figure 3C:
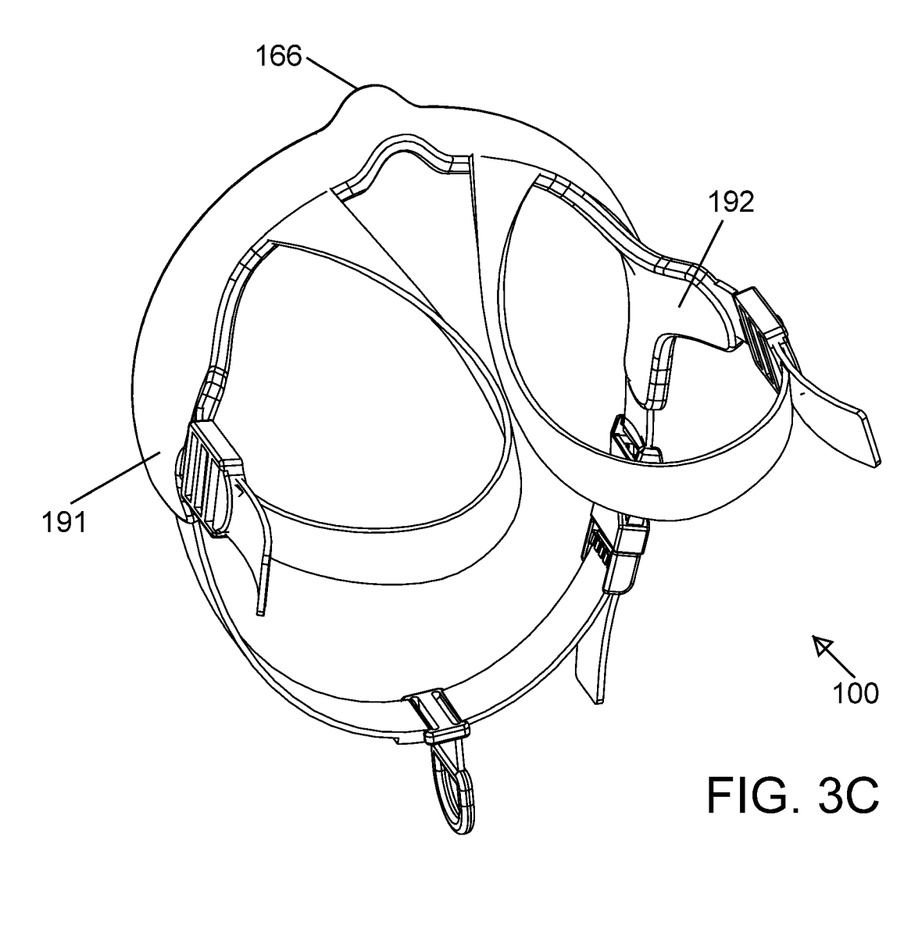
Figure 4:
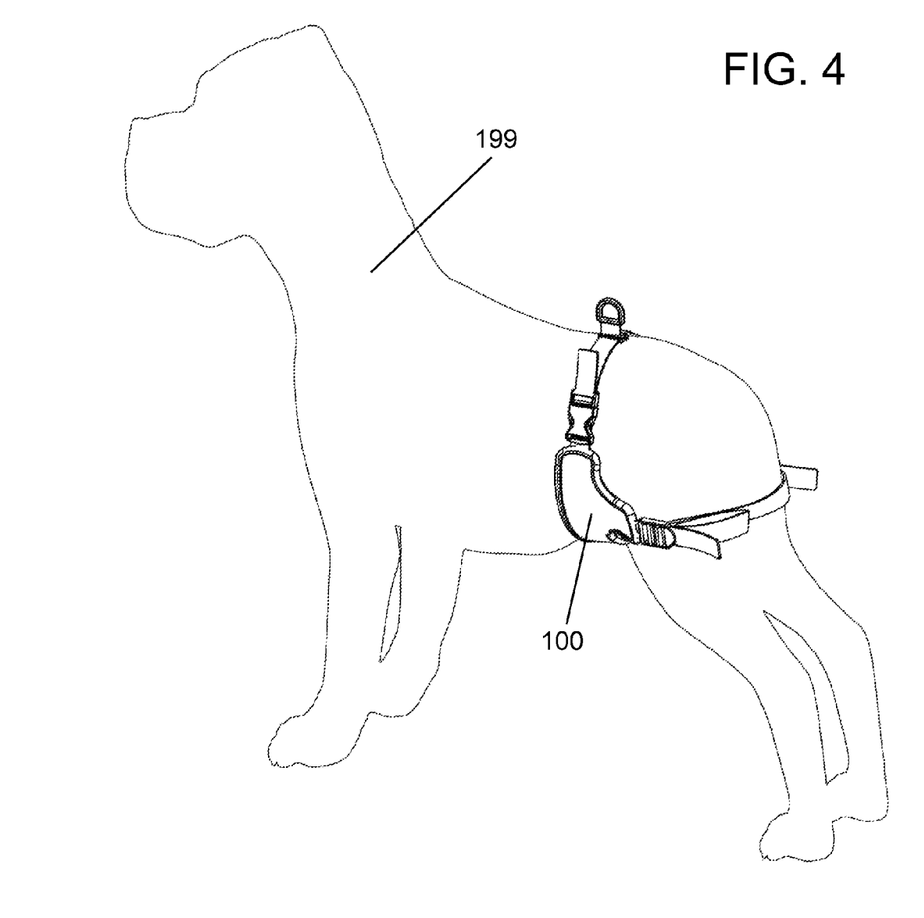
FIG. 4 is a schematic illustration of a harness worn by a dog, in accordance with some demonstrative embodiments of the present invention.

Body loop 110 may be placed to encircle or surround the rear abdominal area of the body of dog 199. Body loop 110 may optionally comprise an open/close mechanism 177 (e.g., a fastener), to allow rapid opening and/or closing of body loop, thereby allowing rapid dressing and undressing of body loop 110 around the body of dog 199. Optionally, the open-close mechanism 177 may also include, or may be coupled to, a mechanism (e.g., a tri-glide ring) for increasing or decreasing the size of body loop 110. Alternatively, body loop 110 may not comprise such mechanism or fastener. It is clarified that harness 100, with or without its fastener(s) or other mechanisms, with or without coating layer(s) or coated portion(s), may not cause friction or itching to dog 199, and may be convenient for dog 199 to wear. It is noted that open-close mechanism 177 is shown in FIGS. 2A and 3A, and may be incorporated as part of body loop 110 in FIGS. 1A-1E.

Rear-right leg loop 111 may comprise an open/close mechanism, for example, a fastener 121. Rear-right leg loop 111 may have a fixed size or diameter. Alternatively, rear-right leg loop 111 may have adjustable or owner-modifiable size or diameter, for example, utilizing a strap 131 that may pass through a claps or aperture which may be comprised in (or attached to) fastener 121 (e.g., implemented as a tri-glide ring, a ladder lock fastener, or the like). The owner may pull strap 131 to decrease the size (or to tighten) rear-right leg loop 111; and the owner may increase the length of strap 131 (e.g., by pulling loop 111 away from strap 131) to increase the size (or to loosen) rear-right leg loop 111. Rear-left leg loop 112 may have identical or generally similar properties, and may similarly comprise a fastener 122 and a strap 132.

Leg loops 111-112 may be slanted downwards (e.g., at approximately 35 or 45 or 55 degrees) relative to a general plane corresponding to the body of dog 199, or relative to the ground or floor when dog 199 is in a generally horizontal position (e.g., standing on four feet). The slanting downward of leg loop 111 may be achieved by connection regions 151-152; and the slanting downward of leg loop 112 may be achieved by connection regions 153-154.

Body loop 110 may comprise a buckle 141 (e.g., a tri-glide buckle or a tri-glide ring) which may be located opposite to connection regions 151-154, at or near a top region of body loop 110. For example, body loop 110 may be constructed as a circular loop having an excessive strap 142 which protrudes and passes through buckle 141, and which ends with a D-ring 143 or other suitable ring or buckle. A leash (e.g., a leading leash, a restraining leash, a retractable leash, a folding leash, a rope, a chain, or the like) may be connected to D-ring 143 and may be held by the owner of dog 199. The combination of body loop 110, buckle 141 and strap 142 (and optionally, a leash) may create a lasso surrounding or pressing the body of dog 199 (or, a loop or harness able to achieve a lasso effect), and particularly surrounding a rear abdominal area of the body of dog 199.

Components of harness 100, and particularly body loop 110 and leg loops 111-112, may be formed of one or more suitable materials, for example, leather, fabric, woven or knit materials, or the like. Such material(s) may be resilient and strong, to allow the owner to restrain dog 199 without the material ripping or breaking. Each one of loops 110-112 may have a width in the range of approximately 15 to 20 millimeters, or approximately 10 to 20 millimeters, or approximately 15 to 25 millimeters, or approximately 10 to 30 millimeters, or approximately 10 to 50 millimeters; other suitable ranges, dimensions and/or proportions may be used. Optionally, an inner side and/or outer side of loops 110-112 may be covered or coated with a smooth coating or polish material, or may be otherwise draped or covered, to provide a smooth and convenient feeling to dog 199 and to avoid injury from raw or rough material(s). It is clarified that harness 100, with or without coating layer(s) or draping and/or polished region(s), may be generally smooth, may not cause friction or itching to dog 199, and may be convenient for dog 199 to wear. It is further clarified that portions of the discussion herein, which may refer to coating or polish or smooth regions, do not imply that other portions of harness 100 are rigid or uncomfortable or causing friction or itching. In some embodiments of the present invention, portions (e.g., portions 191 and 192) of leg loops 111-112 may be implemented as wider and/or thicker and/or larger portions or regions, as depicted particularly in FIGS. 2A-2C and in FIGS. 3A-3C.

Harness 100 may be dressed onto dog 199 by its owner. For example, the owner may open body loop 110 or may expand or maximize the diameter of body loop 110, to allow spacious entry thereto of the rear end of dog 199. Body loop 110 may thus be dresses around the rear abdominal area of dog 199 (e.g., ensuring that coated parts or smooth parts of body loop 110 are facing internally towards the body of dog 199). D-ring 143 may extend outwardly away from the body of dog 199, and may be positioned or rotated to be at the top area of body loop 110. Then, leg loops 111-112 may be dressed on the top potions of rear legs of dog 199, and may be secured to their respective positions by optionally stretching or pulling straps 131-132 to achieve a desired grip. Once harness 100 is securely dressed on dog 199, the leash may be connected to D-ring 143; even though some owners may choose to attach the leash prior to, or during, the dressing of harness 100 onto dog 199.

If dog 199 jumps or outbursts forward towards a target (e.g., a food item, an object, a person, an animal), the forward-directed force of such jump or outburst may contradict a backward-applied force applied by the owner holding the leash (or pulling back the leash), thereby creating a lasso effect which may slightly tighten or shrink body loop 110. Additionally or alternatively, the lasso effect may be achieved or actuated or initiated by the owner or user or "driver" of dog 199, not necessarily in conjunction with an outburst or jump or forward-movement by dog 199. For example, a slight or gentle pulling of the leash (e.g., upwards, backwards, or in a slanted direction) may be used to achieve the lasso effect, and may be used to correct or to stop an undesired behavior (e.g., not necessarily an outburst or a "negative" behavior) of dog 199, for example, exposure of teeth, chewing on shoes or sleepers, or the like, thereby allowing pro-active training and behavior-correction of dog 199.

The tightening of body loop 110 in the rear abdominal area of dog 199, typically may not cause physical pain to dog 199. Rather, the tightening of body loop 110 may result in sensory tension or sensory trigger to dog 199, thereby creating a physical and physio-psychological restraining effect or calming effect on dog 199, and thereby stopping or constraining such jump or outburst of dog 199. Such lasso effect may create sensory pressure on the abdominal area and/or side area(s) of dog 199, without causing physical pain to dog 199 in said areas.

Additionally or alternatively, the lasso effect may optionally (e.g., not necessarily) limit or restrain the mobility of the rear legs of dog 199, which may be secured or gripped by leg loops 111-112 connected to body loop 110. The mobility limitation may cause dog 199 to lose its maneuverability and coordination, and may limit the exiting propulsion of dog 199, i.e., the power to burst forward (towards the target) which derives from the hind legs of dog 199.

Additionally or alternatively, the lasso effect and the sensory input at the rear end of dog 199, may cause dog 199 to instinctively turn back its head (and/or its neck) in order to look backwards and see what exactly is causing such effect or sensation. As a result, by looking backwards instinctively, dog 199 may no longer be "locked on target", even momentarily, thereby breaking or stopping an outburst of dog 199 towards such target. Breaking or interrupting the eye contact of dog 199 with its target, and diverting the attention of dog 199 to its rear end, may distract or divert dog 199 from looking at its target. The interruption of eye contact of dog 199 with its target may cause a physiological-psychological effect, allowing the owner to regain control of dog 199 and return to correctly and safely leading dog 199. Accordingly, harness 100 may thus provide a combination of physical effects allowing behavioral and/or physical restraint of dog 199, as well as a physio-psychological effect allowing the owner of dog 199 to regain control.

Harness 100 may be utilized in conjunction with any suitable type or breed of dog 199, with male or female dogs, with dogs of various sizes or ages, and with dogs of various temperament or physical conditions. Optionally, some dog owners may refrain from using harness 100 in conjunction with a female dog during its pregnancy term, or with a puppy or young dog (e.g., younger than six months), or with a sick dog or disabled dog or mature dog. It is clarified that harness 100 may be used on conjunction with all these (and other) types of dogs, however, some dog owners may selectively decide to refrain from using harness 100 for certain particular dogs as mentioned above.

Harness 100 may provide an immediate solution for any improper behavior of dog 199. Harness 100 may improve the quality of life of the owner or "driver" of dog 199, while providing a product that is universal, friendly, and is easy for use by any dog owner (e.g., adults, children, teenagers, senior citizens, persons with disabilities, males and females, right-handed and left-handed owner).

Harness 100 may be suitable for use by a trainer or owner of a wild animal, a large canine carnivores, or other suitable pets or animals. Harness 100 may allow trainers or owners to achieve various animal-related goals, for example, apprehension, treatment, research, stabilization of the animal, and prevention or curtailing of an outburst. Harness 100 may be used as a behavioral product, controlling dog 199 and providing to its owner a comfortable advantage position. Harness 100 may generate an uneasy sensation to dog 199 upon its outburst, since pressure on the lower abdominal area may transmit to dog 199 a sensation of submission.

Applicants have realized that a dog that submits to a rival, may often lie down on its back and expose its pelvis area, lumbar, lower abdominal area, internal organs and reproductive organs towards the rival (e.g., as a sign of submission). Accordingly, contact with (or sensation to) the lower abdominal area of the dog, when leading or halting or restraining the dog (e.g., when the dog exhibits aggression, over-excitement, or impulsive pulling of the owner), or when a non-desired behavior occurs which the dog owner wishes to stop or to correct, may generate the submissive nuance and may halt or restrain the continuity of unwanted behavior. This systematic technique may form instrumental conditioning between the owner and dog 199.

Harness 100 may provide the owner physical control of dog 199 without using of force. Harness 100 may allow controlling a canine carnivore or other mammal or animal safely and with no physical effort. Harness 100 may be safe for use with dogs of all breeds, genders and age, and may not harm dog 199. In contrast with a conventional harness or leash, harness 100 may not cause dog 199 physical pain; but rather, harness 100 may utilize a principle of mental pressure and relief through an instrumental learning mechanism and the creation of instrumental conditioning.

By using harness 100, the learning experience of dog 199 facing the owner and the negative behavior correction experience, are not associated by dog 199 to its owner (thus, causing dog 199 to fixate the correction of the negative behavior to one specific owner), but rather, causing dog 199 to associate the learning experience and correction of negative behavior with the object and situation which caused the experience. In contrast with conventional leashes or harnesses, the owner of dog 199 utilizing harness 100 may not require mental, emotional, physical or vocal means to stop dog 199 from carrying out the negative behavior, and the owner may direct dog 199 to proper behavior on the basis of positive learning.

In a first demonstrative example, dog 199 may wear harness 100 while its owner holds the leash. While dog 199 walks with its owner, dog 199 may pounce towards a senior citizen. The mere holding (by the owner) of the leash connected to harness 100, may cause the pounce of dog 199 towards the senior citizen to cause application of pressure on the abdominal area of dog 199 (a sensitive and submissive area of dog 199), thereby causing dog 199 a feeling of unease (yet not causing pain) while facing the senior citizen (the current object with which the behavioral correction is required), thus creating a positive instrumental conditioning learning experience while dog 199 is facing the object. Furthermore, in a subsequent event in which dog 199 sees the same object or target, dog 199 may not attempt to jump towards (or to outburst or run towards) that object or target, since the situation may be connected or linked with the previous feeling or sensation. This may be in contradiction with a negative learning experience, in which pain and/or noise are associated with the origin of said pain and/or noise (e.g., the owner or "driver" of dog 199). Thus, in accordance with the present invention, a positive instrumental conditioning learning experience, which is first and foremost safe for both the owner and dog 199, may be created regarding the situation requiring correction, and not the specific owner or "driver" of dog 199.

In a second demonstrative embodiment, harness 100 may be used for training puppies and young dogs, which may be energetic, instinctual and/or highly active. Leading such dogs may be difficult for any owner, particularly when there is a lack of compatibility between the breed of dog and the owner. Young dogs may tend to impulsively outburst whilst being led, thereby causing harm to themselves and to the owner. This may be particularly true when the young dog is led by a young child. Properly holding the leash connected to harness 100, may allow a young child or other owner, who may not be physically able to respond to an outburst of dog 199, to correct the negative behavior with minimal physical need. Thus, a positive instrumental conditioning learning experience, which is first and foremost safe for both the owner and dog 199, may be created regarding the situation requiring correction, and not the specific owner or "driver" of dog 199.

Harness 100 may thus be utilized by any owner or driver, with any dog, providing a solution for correction of negative behavior in a positive instrumental conditioning manner, while keeping a clear ethical code and moral code, upholding the rights of the dog and allowing the owner to fully enjoy the relationship with the dog.

Optionally, harness 100 may be manufactured as an assembly of three parts. The first part may be a bottom part, intended for placement on the rear end of the body of dog 199 (e.g., draped or undraped), encircling the rear part of the body circumference of dog 199 (e.g., located at approximately 20 or 25 or 33 or 40 percent of the length of the body of dog 199, measuring from the rear end going forward). The first part may have, on its side, a strap extending upwards towards the upper-most area on the dog's back, ending with a tri-glide ring. In the second part, at the left side of the bottom part, an attach/release/extension buckle or fastener may be used, connected to a strap running upwards and through the tri-glide ring, thereby creating a lasso effect; the strap ending with a "D" type ring to allow connecting of the harness to a main leash. In the third part, strap loops may be sewed to the bottom part of harness 100 at a suitable angle (e.g., approximately around 45 degrees, 60 degrees, 75 degrees, 90 degrees, 105 degrees, or other suitable values), placed on the right and left hind legs of the dog, optionally including ladder lock fasteners or other mechanism for adjusting or modifying the loops diameters. Optionally, fabric covers may be applied around the sewing area of the bottom loops to the first part. Optionally, a fabric cover may be applied to the entire first portion, for example, having neoprene or polyester materials on the exterior side, and having a three-dimensional mesh net on the interior side (facing the body of dog 199).

Optionally, a bottom area or lower region of body loop 110 may optionally include a protrusion 166, which may be or may comprise, for example, a pin, a set of pins, a curve, a curvature similar to a "U" shape or an upside-down "U" shape, or the like. The optional protrusion 166 is particularly shown in FIGS. 3A-3C, and is omitted (as an optional component) from FIGS. 1A-1E and 2A-2C.

Protrusion 166 may be fixed or affixed to body loop 110; or may be optionally attachable to and/or detachable from body loop 110; or may be otherwise added to, or removed from, body loop 110. Protrusion 166 may be located away from the private parts or genitals of dog 199, so as to not cause harm or inconvenience to dog 199.

In some embodiments of the present invention, optionally, protrusion 166 may be or may include a concaved area or curved area or protruding area which may face away from the body of dog 199; and once the lasso effect (described above) is applied, may operate to avoid any potential or remotely-potential harm or pain (or sensation or friction) to the genitalia of dog 199, as a safety-oriented element; for example, protrusion 166 may function as a bridge or barrier, over and/or near and/or around the genitalia of dog 199 (e.g., particularly for male dogs), thereby further covering or protecting or secluding the genitalia of dog 199 once harness 100 is narrowed-down by the lasso effect.

In other embodiments of the present invention, optionally, protrusion 166 may be or may include a concaved area or curved area or protruding area which may face towards body of dog 199 and may create a local sensation and/or an additional sensation and/or may amplify or increase any local and/or additional sensation and/or an additional type of sensory trigger at that particular point or region, particularly in the lower region of the rear lower abdominal area of dog 199.

Figure 5:
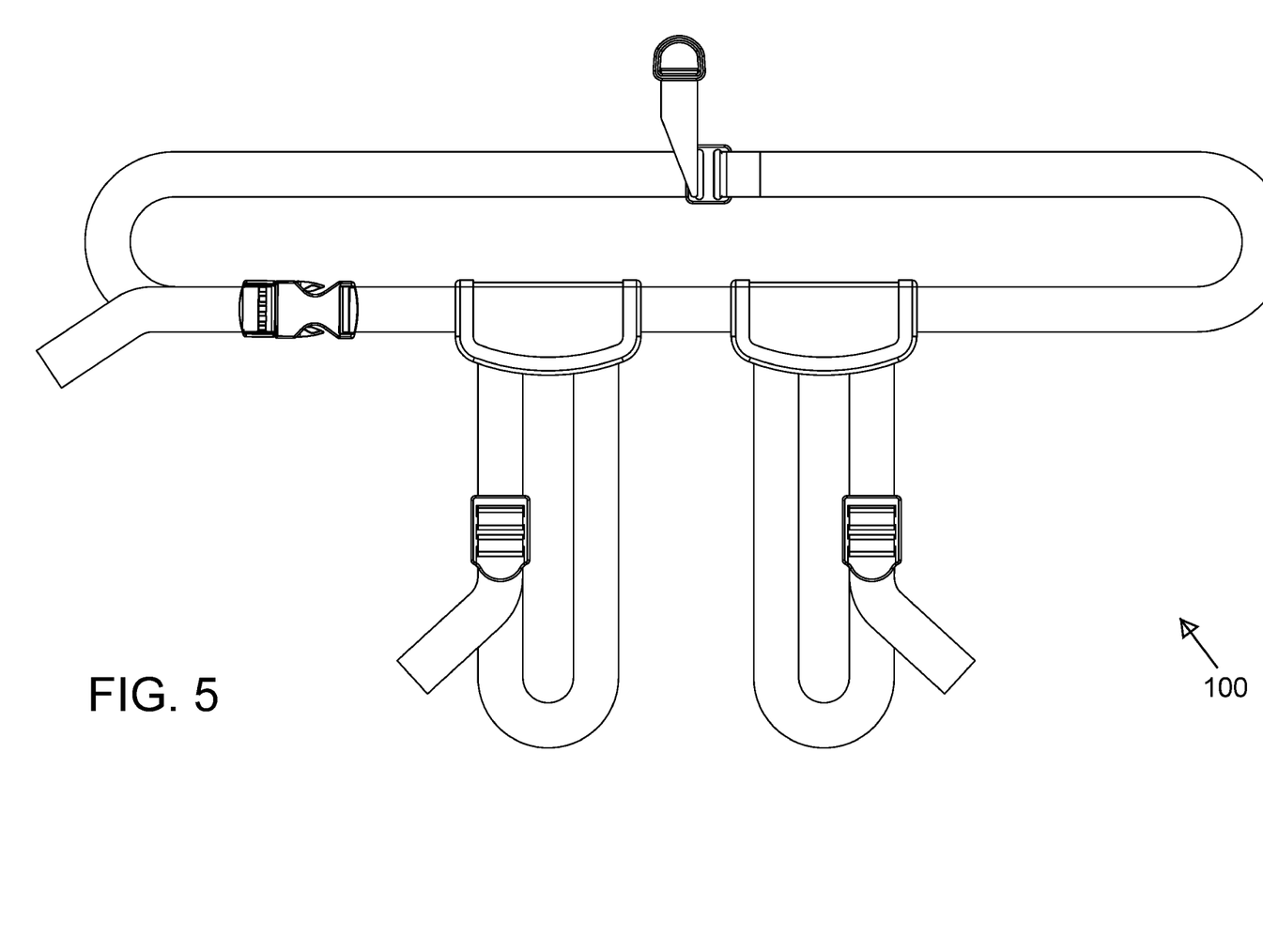
FIG. 5 is a schematic illustration of a flattened view of a harness, in accordance with some demonstrative embodiments of the present invention.

Reference is made to FIG. 5, which is a schematic illustration of harness 100 in a "flat" position, in which all the components of harness 100 are shown on the same plane, for demonstrative purposes.

Figure 6:
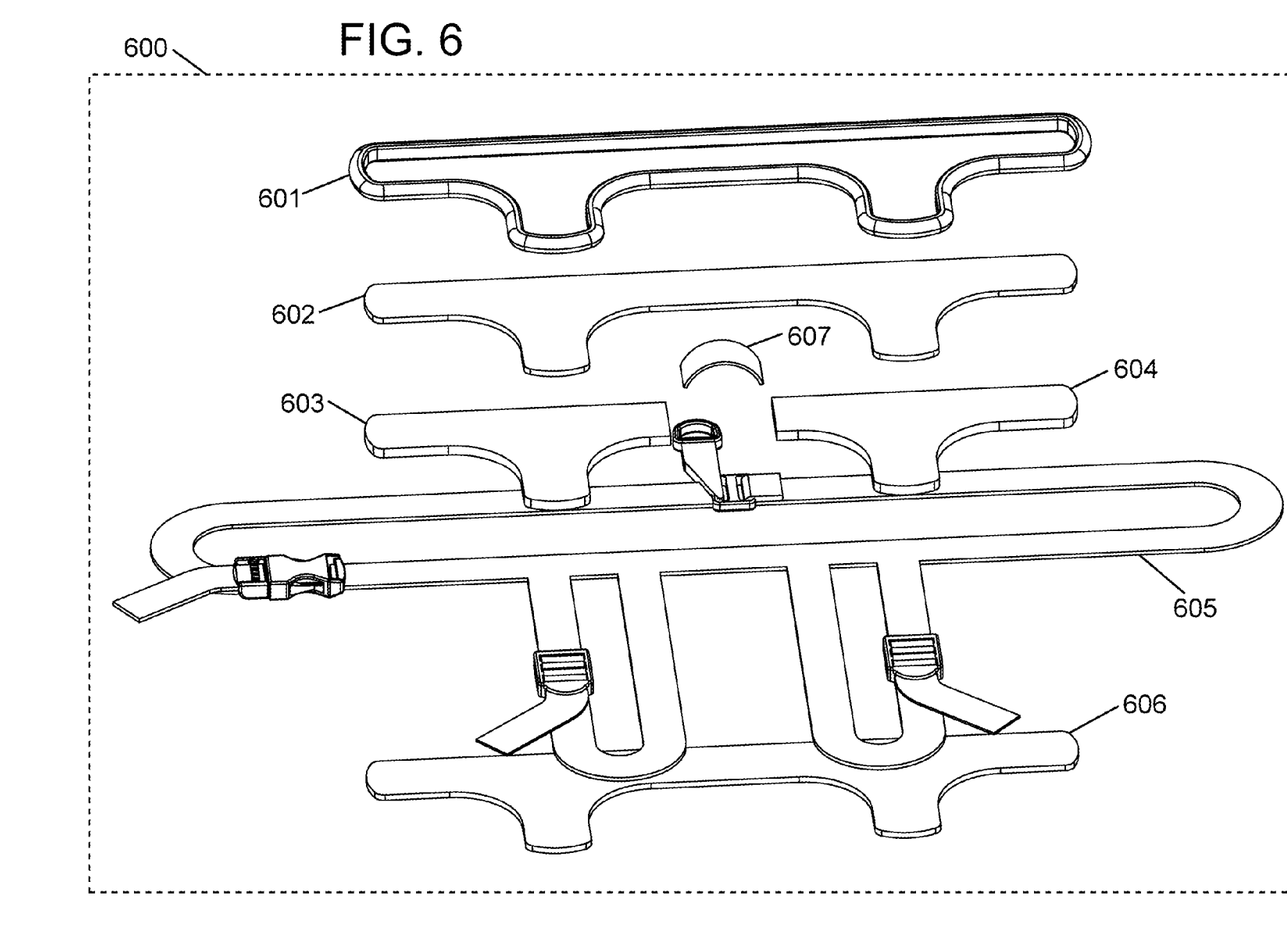
FIG. 6 is a schematic illustration of a set of elements which may be assembled to produce a harness, in accordance with some demonstrative embodiments of the present invention.

Reference is made to FIG. 6, which is a schematic illustration of a set 600 of elements or layers or components 601-607 which may be used or assembled or connected in order to produce harness 100. It is noted that element 607 may correspond to protrusion 166 of FIG. 3A, and may be optional.

Although portions of the discussion herein may relate, for demonstrative purposes, to two rear-leg loops 111-112, the present invention may comprise harnesses having only one such rear-leg loop (either 111 or 112), or having no rear-leg loops at all.

Although portions of the discussion herein may relate, for demonstrative purposes, to utilization of harness 100 in conjunction with dog 199, the present invention may comprise harnesses adjusted or configured to be used in conjunction with other pets, other mammals, other four-legged mammals, carnivore animals, or other animals.

Functions, operations, components and/or features described herein with reference to one or more embodiments of the present invention, may be combined with, or may be utilized in combination with, one or more other functions, operations, components and/or features described herein with reference to one or more other embodiments of the present invention.

While certain features of the present invention have been illustrated and described herein, many modifications, substitutions, changes, and equivalents may occur to those skilled in the art. Accordingly, the claims are intended to cover all such modifications, substitutions, changes, and equivalents.

What is claimed is:

1. A harness (100) for restraining an animal, the harness (100) comprising:
    a body loop (110) comprising an elongated strap adapted to encircle a rear abdominal area of the animal and to pass through a top-side buckle (141), wherein an excess portion (142) of the elongated strap, after passing through the top-side buckle (141), and while being located above the rear abdominal area of the animal, ends at a connector (143) to a leash;
    a first rear-leg loop (111) to encircle a top area of a first rear leg of the animal, wherein the the first rear-leg loop (111) is connected to the body loop (110) via a first set of two downwardly-slanting connection regions;
    a second rear-leg loop (112) to encircle a top area of a second rear leg of the animal, wherein the second rear-leg loop (112) is connected to the body loop (110) via a second set of two downwardly-slanting connection regions;
    wherein the first rear-leg loop (111) is non-connected to the second rear-leg loop (112);
    wherein the elongated strap of the body loop (110), together with the top-side buckle (141) and the excess portion (142) of the elongated strap comprise a lasso mechanism which tightens the body loop (110) at the rear abdominal area of the animal upon an outburst of said animal;
    wherein a lower region of the body loop (110), which is located near the rear-abdominal area of the animal, comprises a curved concaved protrusion element, (a) to maintain the lower region of said body loop (110) away from genitalia of the animal, and (b) to protect the genitalia of the animal once the body loop (110) is tightened upon the outburst of the animal.

2. The harness of claim 1, wherein the lasso mechanism causes shrinkage of the body loop upon said outburst of said animal.

3. The harness of claim 1, wherein upon said outburst of said animal, the lower region of said body loop generates sensation to underside of the rear abdominal area of the animal.

4. The harness of claim 1, wherein prior to said outburst of said animal, the lower region of said body loop is maintained away from genitalia of the animal.

5. The harness of claim 1, wherein at least an inward-facing side of the body loop is coated.

6. The harness of claim 1, wherein connections between the body loop and the first and second rear-leg loops are coated.

7. The harness of claim 1, wherein a lower area of the body loop comprises said curved concave protrusion element protruding away from an underside of the rear abdominal area of the animal.

8. The harness of claim 1, wherein the curved concave protrusion element comprises a U-shaped element.

9. The harness of claim 1, wherein
    a the first rear-leg loop (111) is connected to said body loop (110) via the first set of two downwardly-slanting connection regions, wherein the second rear-leg loop (112) is connected to said body loop (110) via the second set of two downwardly-slanting connection regions;
    wherein the curved concaved protrusion element is located between (a) the first set of two downwardly-slanting connection regions and (b) the second set of downwardly-slanting connection regions.

10. The harness of claim 1, wherein at least one of the first and second rear-leg loops (111, 112) is connected at an angle to said body loop (110).

11. The harness of claim 10, wherein said angle comprises an angle selected from the group consisting of: approximately 45 degrees, approximately 60 degrees, approximately 75 degrees, approximately 90 degrees, and approximately 105 degrees.

12. The harness of claim 1, wherein the body loop comprises an open/close mechanism for opening/closing said body loop.

13. The harness of claim 1, wherein the body loop comprises a diameter modification mechanism to allow a user to increase and decrease a diameter of said body loop independently of said outburst of the animal.

14. The harness of claim 1, wherein the connector (143) comprises a D-shaped ring.

15. The harness of claim 1, wherein the animal comprises a dog.

16. The harness of claim 1, wherein the first and the second rear-leg loops (111, 112), when placed on the first and the second rear legs of the animal, allow the first and the second rear legs of the animal to move.

17. The harness of claim 1, wherein the body loop (110) and the first and the second rear-leg loops (111, 112), when worn by the animal, allow the animal to walk but constrain outbursts of the animal.

* * * * *